July 1, 1969  R. G. RAKES ET AL  3,453,514
SINGLE SENSOR BRUSHLESS D.C. MOTOR
Filed May 2, 1967
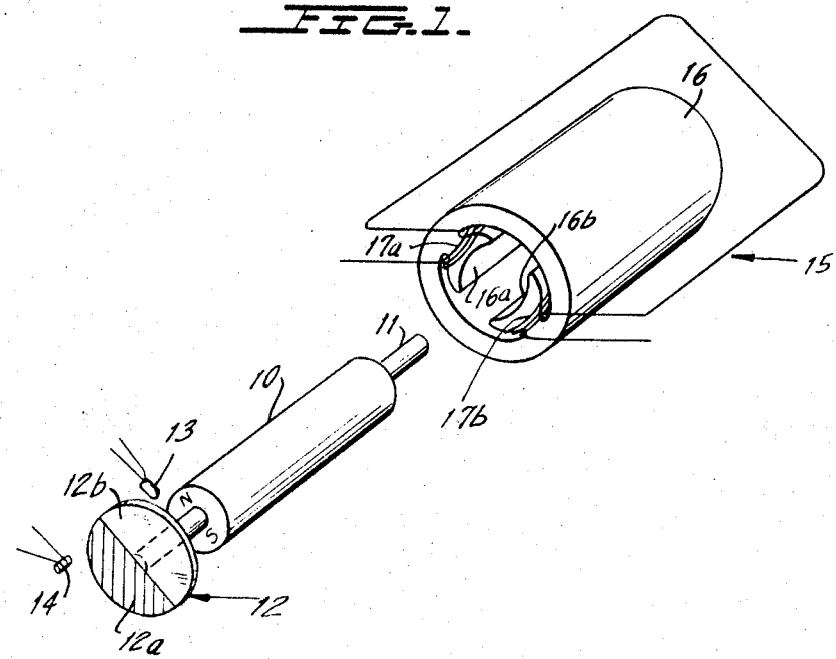
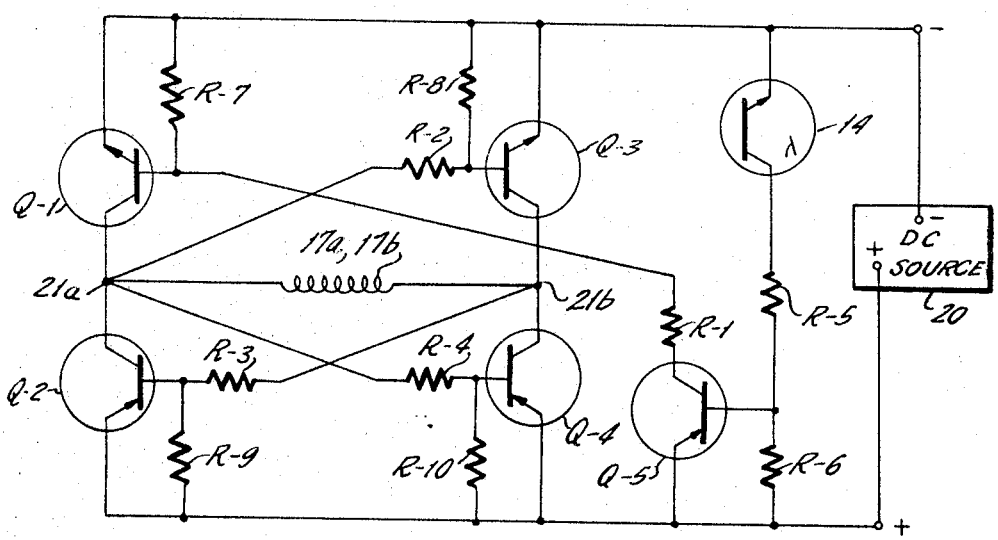
INVENTORS
RODNEY G. RAKES
RICHARD A. FINK
BY

United States Patent Office 3,453,514
Patented July 1, 1969

3,453,514
SINGLE SENSOR BRUSHLESS D.C. MOTOR
Rodney G. Rakes, Bristol, and Richard A. Fink, Blountville, Tenn., assignors to Sperry Rand Corporation, Sperry Farragut Company Division, Bristol, Tenn., a corporation of Delaware
Filed May 2, 1967, Ser. No. 635,566
Int. Cl. H02k 21/08, 21/26; H02p 1/18
U.S. Cl. 318—138                                  6 Claims

ABSTRACT OF THE DISCLOSURE

A brushless D.C. motor is constructed with a double-pole double-throw type of solid state switching means for connecting a single main winding to the terminals of a D.C. energizing source. A single photo pickup is used to detect rotor position and to operate the switch means in a manner such that low impedance connections are provided between the ends of the main winding and appropriate terminals of the energizing source so that current reversals in the main winding generate a reversing flux field which interacts with the permanent magnet rotor to obtain motor action.

---

This invention relates to brushless D.C. motors in general and more particularly relates to an inexpensive construction for a motor of this type by utilizing a single rotor position sensing element.

For many types of communications apparatus, only D.C. power is available for operation. It often happens that other apparatus requiring electric motors must be operated in connection with such equipment. While the operating characteristics of D.C. motors are for the most part very desirable, electrical interference produced by sparking of mechanical brushes in conventional D.C. motors is most undesirable.

The prior art has recognized that it is possible to replace more conventional mechanical communicating devices by solid state switching devices and in this way avoid sparking. However, those of such prior art constructions which have operated satisfactorily have been very expensive because of the numerous switching elements and motor winding taps required. As will hereinafter be seen, the instant invention provides a relatively inexpensive construction for a brushless D.C. motor by utilizing a single rotor position detecting element to control current reversals through the main motor winding.

Accordingly, a primary object of the instant invention is to provide an inexpensive reliable construction for a brushless D.C. motor.

Another object is to provide a brushless D.C. motor which requires only a single rotor position sensing element.

Still another object is to provide a brushless D.C. motor of this type having a single untapped main winding.

These objects as well as other objects of this invention will become readily apparent after reading the following description of the accompanying drawings in which:

FIGURE 1 is an exploded perspective, in somewhat schematic form, showing the main mechanical elements of a brushless D.C. motor constructed in accordance with the teachings of the instant invention. Shaft bearings and other construction details well known to the art are omitted so as not to have a confused looking drawing.

FIGURE 2 is an electrical schematic showing the solid state switching means for the motor elements of FIGURE 1.

Now referring to the figures. The motor of the instant invention includes permanent magnet rotor 10 mounted to shaft 11 which carries disk 12 interposed between lamp 13 and photo pickup sensor 14. Disk 12 is divided into semicircular sections 12a, 12b with the former section 12a being opaque and the latter section 12b being transparent, for reasons which will hereinafter be explained. Stator 15 includes hollow cylindrical magnetic frame 16 having diametrically opposed inwardly projecting pole pieces 16a, 16b. Main winding sections 17a, 17b are wound around pole pieces 16a, 16b in appropriate directions so that fluxes generated by current flow in winding sections 17a, 17b aid one another. In order to make the motor self starting, the curved faces of pole pieces 16a, 16b are eccentric with respect to the outer surface of rotor 10 thereby creating tapered air gaps as explained in U.S. Patent No. 3,264,538. In a manner known to the art, rotor 10, magnetized across its diameter, is assembled to stator 15 by insertion therein between the curved faces of pole pieces 16a, 16b.

One terminal of photo sensor 14 is connected to the negative terminal of D.C. source 21 while the other terminal of sensor 14 is connected, through resistors R–5 and R–6 in series, to the positive terminal of D.C. source 20. The juncture between resistors R–5 and R–6 is connected directly to the base of transistor Q–5 having its emitter connected to plus and its collector connected through R–1 in series with R–7 to minus. The juncture between resistors R–1, R–7 is connected directly to the base of transistor Q–1 having its emitter connected directly to minus and its collector connected to end 21a of main winding 17a, 17b. Winding end 21a is also connected to the collector of transistor Q–2 having its emitter connected to plus and its base connected through R–3 to the other end 21b of main winding 17a, 17b. Resistor R–9 is in parallel with the emitter-base circuit of transistor Q–2.

Main winding end 21a is further connected through R–4 to the base of transistor Q–4. Resistor R–10 is in parallel with the emitter-base circuit of transistor Q–4 having its emitter connected to plus and its collector connected to main winding end 21b. Main winding end 21a is still further connected through resistor R–2 to the base of transistor Q–3 having its emitter connected to minus and its collector connected to main winding end 21b. Resistor R–8 is in parallel with the base-emitter circuit of transistor Q–3.

With rotor 10 positioned so that opaque section 12a blocks transmission of light from lamp 13 to sensor 14, Q–2 and Q–3 are in their conducting or low impedance states. At this time the base drive for transistor Q–2 is received through the emitter-collector circuit of Q–3. Similarly, the base drive for Q–3 is received through the emitter-collector circuit of Q–2. Thus, current supplied by source 20 flows from winding end 21a to winding end 21b and generates a flux field which coacts with permanent magnet rotor 10 to rotate the latter and thereby reposition disk 12.

When photo sensor 14 is illuminated by the radiation from lamp 13 passing through transparent section 12b, the resistance of pickup 14 lowers to a value such that the base of control amplifier transistor Q–5 receives enough drive to saturate and current flows in the base of Q–1 through R–1 turning Q–1 on. When Q–1 is on, Q–4 receives base drive current through R–4 and through the emitter-base circuit of Q–1. Now the current in main winding 17a, 17b reverses direction (flows from winding end 21b to winding end 21a) flowing through the emitter-collector circuits of Q–1 and Q–4.

Q–1 and Q–4 remain in their low impedance, or on states, until disk 12 is repositioned so that section 12a blocks light radiated from lamp 13 from impinging on pickup 14. Upon the latter occurrence Q–1 and Q–4 cease conducting and Q–2 and Q–3 commence conducting so that the direction of current through main winding 17a, 17b again reverses direction.

Thus, it is seen that the instant invention provides a novel construction for a brushless D.C. motor which requires only a single sensing element to detect rotor position and utilizes a single untapped main motor winding to produce high overall efficiency in that for any given position of the rotor, current flows through the entire winding and contributes to motor action. Transistors Q–1, Q–2, Q–3 and Q–4 are connected to form an electronic flip-flop in which the flip-flop section Q–2, Q–3 is normally on. Transistor Q–5 in circuit with photo pickup 14 controls the on-off operation of flip-flop section Q–1, Q–4 with this section being electrically interlocked with section Q–2, Q–3 so that when the latter is on the former is off, and vice versa.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A brushless D.C. motor including a power section, terminal means for connecting said motor to a D.C. energizing source, a solid state switching section for connecting said power section to said terminal means, rotor position detecting means for controlling operation of said switching section; said power section including a permanent magnet rotor and a stator having winding means for generating a changing flux field coacting with said rotor to cause rotation thereof; said switching section including a plurality of semi-conductor devices connected together as an electronic flip-flop interposed between said terminal means and said winding means; said switching means further including a portion for operating a first section of said flip-flop into a low impedance state and a second section of said flip-flop into a high impedance state during certain angular positions of said rotor; for remaining angular positions of said rotor said portion operating said first section into a high impedance state and said second section into a low impedance state; said sections when in their low impedance states providing low impedance current path sections between said winding means and said terminal means whereby current flow in said winding means generates a magnetic flux field of predetermined orientation when said first section of said flip-flop is in its low impedance state and current flow in said winding means generates a flux field reversed with respect to said predetermined orientation when said second section of said flip-flop is in its said low impedance state; said rotor position detecting means including a single sensing means in circuit with said portion of said switching means for controlling operation thereof and a rotatable part mounted to said rotor in spaced signal coupling relation with respect to said sensing means for actuating said sensing means when said rotor is in said certain angular positions whereby said first section of said flip-flop is in its low impedance state for said certain angular positions and deactuating said sensing means when said rotor is in said remaining angular positions whereby said second section of said flip-flop is in its low impedance state.

2. A brushless D.C. motor as set forth in claim 1 in which the terminal means includes a first and a second terminal; said winding means comprising a single main winding; said first section of said flip-flop including first and second semi-conductor devices interposed between the respective first and second terminals and respective first and second ends of said winding; said second section of said flip-flop including third and fourth semi-conductor devices interposed between the respective first and second terminals and the respective second and first ends of said winding; said semi-conductor devices being unidirectional current conductors whereby current flow in said winding is in a first direction when said sensing means is actuated and current flow in said winding reverses when said sensing means is deactuated.

3. A brushless D.C. motor as set forth in claim 2 in which there is a source of radiation and said sensing means is sensitive to radiation from said source, said rotatable part constructed and positioned to control impingement of said radiation upon said sensing means in accordance with rotor position.

4. A brushless D.C. motor as set forth in claim 2 in which said first, second, third and fourth devices include respective first, second, third and fourth emitter-collector circuits and respective first, second, third and fourth control electrode circuits; said second and third control electrode circuits connected to said first and said fourth emitter-collector circuits; said fourth control electrode circuit connected to said second and third emitter-collector circuits; said first control electrode connected in circuit with said sensing means.

5. A brushless D.C. motor as set forth in claim 4 in which said second and said third control electrode circuits are connected to said first end of said winding and said fourth control electrode circuit is connected to said second end of said winding.

6. A brushless D.C. motor as set forth in claim 5 in which there is a source of radiation and said sensing means is sensitive to radiation from said source, said rotatable part constructed and positioned to control impingement of said radiation upon said sensing means in accordance with rotor position.

References Cited
UNITED STATES PATENTS

| | | | |
|---|---|---|---|
| 3,309,592 | 3/1967 | Faure | 318—138 |
| 3,373,328 | 3/1968 | Hobo | 318—254 |

ORIS L. RADER, *Primary Examiner.*

G. R. SIMMONS, *Assistant Examiner.*

U.S. Cl. X.R.

318—254